United States Patent [19]

Saito et al.

[11] 4,250,305

[45] Feb. 10, 1981

[54] PROCESS FOR PREPARING CELLULOSE ETHER

[75] Inventors: Motoyasu Saito; Hideaki Mukohyama, both of Yatsushiro, Japan

[73] Assignee: Kohjin Co., Ltd., Tokyo, Japan

[21] Appl. No.: 67,667

[22] Filed: Aug. 20, 1979

[30] Foreign Application Priority Data

Sep. 1, 1978 [JP] Japan .................................. 53-106312
Dec. 28, 1978 [JP] Japan .................................. 53-16114
Feb. 15, 1979 [JP] Japan .................................. 54-15487
Feb. 16, 1979 [JP] Japan .................................. 54-16100

[51] Int. Cl.$^3$ .................... C08B 11/02; C08B 11/16; C08B 11/193
[52] U.S. Cl. ...................................... 536/84; 536/85; 536/88; 536/90; 536/98; 536/101
[58] Field of Search ...................... 536/84, 85, 88, 90, 536/98, 101

[56] References Cited

U.S. PATENT DOCUMENTS

| | | | |
|---|---|---|---|
| 2,254,249 | 9/1941 | Swinehart et al. | 536/100 |
| 2,523,377 | 9/1950 | Klug | 536/98 |
| 3,549,309 | 12/1970 | Ring et al. | 536/84 |
| 3,549,617 | 12/1970 | Whitmeyer | 536/84 |
| 3,652,540 | 3/1972 | Determann et al. | 536/85 |
| 3,728,331 | 4/1973 | Savage | 536/88 |
| 3,789,117 | 1/1974 | Tsujino | 424/35 |
| 3,896,108 | 7/1975 | Klug | 536/90 |

FOREIGN PATENT DOCUMENTS

| | | |
|---|---|---|
| 45-678 | 1/1970 | Japan . |
| 53-12954 | 5/1978 | Japan . |
| 403982 | 12/1933 | United Kingdom ....................... 536/85 |

*Primary Examiner*—Ronald W. Griffin
*Attorney, Agent, or Firm*—Armstrong, Nikaido, Marmelstein & Kubovcik

[57] ABSTRACT

A process for preparing a cellulose ether which comprises reacting celluloses untreated or treated with an aqueous solution of alkali hydroxide with an etherifying agent in the presence of an aqueous solution of alkali hydroxide, an organic solvent being substantially immiscible with water and capable of dissolving the etherifying agent and a quaternary salt having the following general formula:

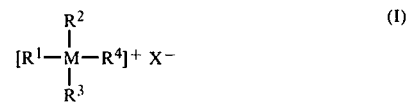

wherein M is nitrogen atom or phosphorus atom, $R^1$, $R^2$, $R_3$ and $R_4$ are independently an organic group and $X^-$ is an anion. According to the process, the etherification is carried out uniformly to give a cellulose ether of a high quality in which the substituents are uniformly distributed. The process includes two processes for preparing a low viscosity carboxymethyl ethyl cellulose: One is a process in which carboxymethyl cellulose is mercerized in the presence of hydrogen peroxide to give a mercerized carboxymethyl cellulose having a low molecular weight and it is etherified according to the above process. The other is a process in which the carboxymethyl ethyl cellulose prepared according to the above process is depolymerized in the presence of hydrogen peroxide. The low viscosity carboxymethyl ethyl cellulose obtained has a uniform quality and give a completely continuous coating film.

12 Claims, 3 Drawing Figures

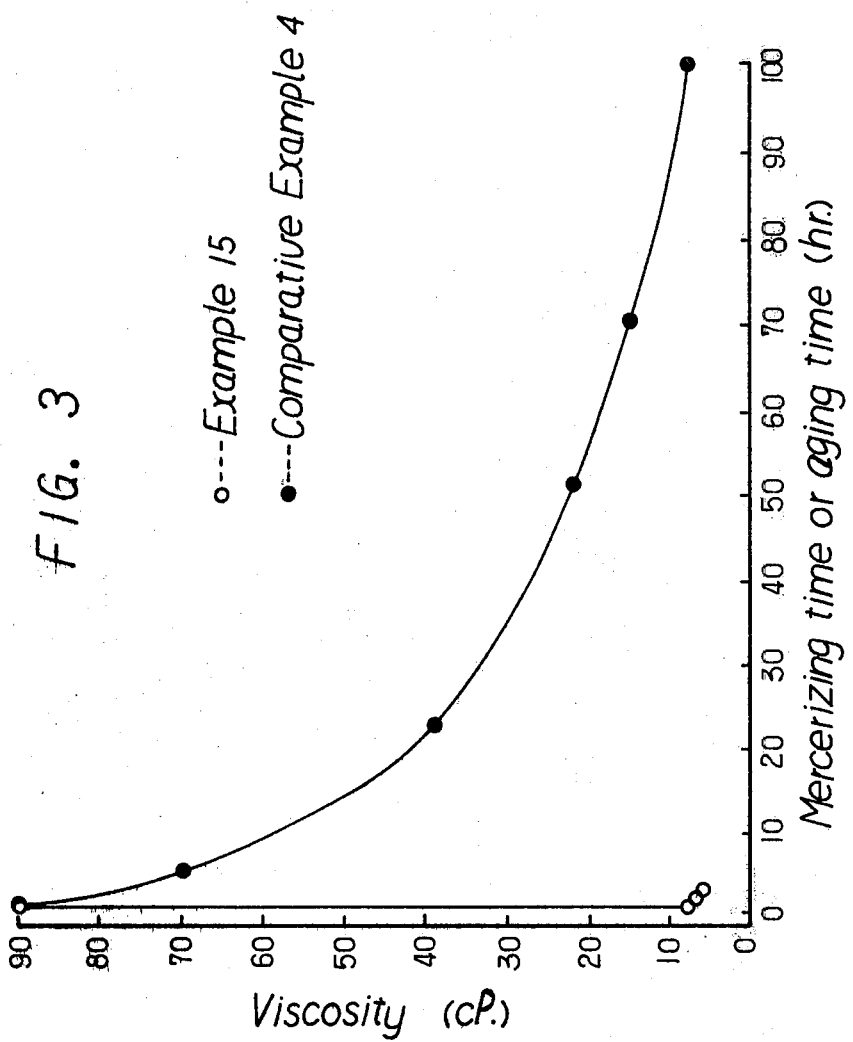

PROCESS FOR PREPARING CELLULOSE ETHER

BACKGROUND OF THE INVENTION

The present invention relates to an improved process for etherifying celluloses. More particularly, it relates to a process for preparing cellulose ethers of a high quality in which the substituents introduced thereinto by etherification are uniformly distributed.

Heretofore, there has been known a process for preparing cellulose ethers in which celluloses such as unsubstituted cellulose, methyl cellulose, hydroxyethyl cellulose and carboxymethyl cellulose are treated with alkali hydroxide to give an alkali cellulose, and the alkali cellulose is reacted with an etherifying agent such as alkyl halide. It has also been known that the quality of the cellulose ether prepared according to such a process varies widely depending upon the uniformity of the distribution of the substituents introduced thereinto by etherification. That is, a cellulose ether in which the substituents are uniformly distributed is of a high quality, i.e. good in solubility to solvents and film-forming property in coating. However, a cellulose ether in which the substituents are not uniformly distributed is of a low quality, i.e. poor in solubility to solvents and film-forming property in coating.

In preparing cellulose ethers according to the prior process, an etherifying agent such as alkyl halide is consumed by side reaction with water being present in the reaction system as well as by reaction with the alkali cellulose. Generally, for this reason, a highly concentrated aqueous solution of alkali hydroxide is employed in preparing the alkali cellulose in order to utilize the etherifying agent effectively. However, the employment of such a highly concentrated aqueous solution of alkali hydroxide causes another disadvantage that alkali hydroxide is not uniformly dispersed into the celluloses, so that a cellulose ether in which the distribution of the substituents introduced thereinto by etherification is non-uniform tends to be formed. Furthermore, the prior process has a fatal defect that the etherification reaction is a heterogeneous reaction which is carried out in a heterogeneous system consisting essentially of an aqueous phase, an organic liquid phase (etherifying agent) and a solid phase (alkali cellulose), so that a cellulose ether in which the distribution of the substituents is non-uniform tends to be formed.

Attempts for preparing cellulose ethers in which the distribution of substituents is uniform have been proposed including a process in which an alkali cellulose of a uniform quality is prepared and it is then subjected to etherification, as described in Japanese Patent Publication No. 12954/1978 and a process in which a solid alkali hydroxide is added in two or more portions during etherification reaction, as described in U.S. Pat. No. 2,254,249. However, these processes have a disadvantage that the reaction procedures are troublesome, and the abovementioned disadvantage due to the hetergeneous reaction is not fundamentally settled.

Recently there has been an attempt for settling the disadvantage due to the heterogeneous reaction in which the etherification reaction is carried out in an aprotic polar solvent such as dimethyl sulfoxide. However, the aprotic polar solvent is expensive, and it is difficult to recover the solvent from the reaction mixture. Furthermore, it is difficult to raise the feed concentration of celluloses since the solubility of celluloses in the aprotic polar solvent is small. For these reasons, the process is disadvantageous for industrial purpose.

On the other hand, the utility of cellulose ethers varies depending upon the viscosity of their solution, in other words, their molecular weight. Even though in the past cellulose ethers giving a solution of a medium viscosity were mainly employed, recently cellulose ethers giving a solution of a high or low viscosity have become important. In particular, the demand for cellulose ethers giving a solution of a low viscosity (hereinafter referred to as "low viscosity cellulose ether") has increased in the field of coatings, and there has been required the development of an economical process for preparing low viscosity cellulose ethers of a high quality.

The preparation of a low viscosity cellulose ether is carried out according to the following two processes: One is a process in which preformed celluloses having a low molecular weight are subjected to etherification. The other is a process in which a preformed cellulose ether is subjected to depolymerization until its molecular weight is lowered to give a desired low viscosity cellulose ether.

The former process includes a process for preparing a low viscosity mixed cellulose ether containing carboxymethyl group from carboxymethyl cellulose (CMC) having a low molecular weight. Generally a mixed cellolose ether containing carboxymethyl group is prepared by reacting a mercerized CMC with an etherifying agent such as alkyl halide. The quality of the resulting mixed cellulose ether is markedly influenced by the uniformity of the mercerized CMC as a starting material. The conditions required for the mercerized CMC are as follows: The distribution of alkali hydroxide therein is uniform. The mercerized CMC contains a sufficient and minimum amount of alkali hydroxide for the reaction with an etherifying agent and a minimum amount of water unless the uniformity of the mercerized CMC is impaired in order to prevent disadvantageous phenomena such as side reaction.

In order to obtain a mercerized CMC satisfying the foregoing conditions, it is assumed that the immersion of CMC in a highly concentrated aqueous solution of alkali hydroxide at an elevated temperature for a short time is preferable. In fact, however, it is difficult to obtain a uniform mercerized CMC according to the mercerization process or to practice the mercerization process due to the restriction caused by the physical properties of CMC as a starting material. For this reason, practically there has been adopted a mercerization process in which CMC is immersed in a low concentrated aqueous solution of alkali hydroxide at a low temperature for a long time and thereafter the resultant is squeezed. The process is hereinafter referred to as "immersing and squeezing process". However, the immersing and squeezing process requires a long production time and much labor. It is difficult to control the concentrations of alkali hydroxide and water in the resulting mercerized CMC. Moreover, the mercerized CMC prepared according to the process should be ground before it is subjected to etherification. Thus the immersing and squeezing process has various problems in the production efficency and the process control.

Furthermore, when a low viscosity mercerized CMC, i.e. a mercerized CMC having a low molecular weight is prepared according to the immersing and squeezing process, an aging for a much long period of time or under drastic reaction conditions is required for cleaving the main chain of CMC. However, CMC tends to be undesirably discolored since it is subjected to the strong action of alkali hydroxide during the aging. Moreover, since the cleavage of the main chain of CMC is carried out in a heterogeneous system, large amounts of components having an extremely short chain length tend to be formed. When a mixed cellulose ether is prepared by employing a mercerized CMC containing such components as a starting material, an etherified CMC corresponding to the components should be removed from the resulting mixed cellulose ether by purification, which results in the low yield of a desired mixed cellulose ether and inevitably the increase in cost, and the increase in the chemical oxygen demand of the waste water exhausted from this step.

It is well known that generally the autoxidation of alkali cellulose is accelerated by a transition element such as cobalt, manganese or iron. In case of mercerizing CMC to prepare a low viscosity mercerized CMC, it is possible to reduce somewhat the aging time by adding such a transition element. However, the catalytic effect of the transition element is not so great. A mixed cellulose ether prepared by employing a mercerized CMC obtained in such a manner is inevitably contaminated by the transition element. Therefore, the aging employing the transition element is undesirable for preparing a mixed cellulose ether employed for use in which the contamination with the transition element should be avoided.

The prior arts relating to the above-mentioned latter process for preparing a low viscosity cellulose ether, particularly a low viscosity carboxymethyl ethyl cellulose, in which a preformed cellulose ether is subjected to depolymerization are as follows: Many processes have been proposed for preparing low viscosity cellulose ethers but generally a depolymerization process in which the main chain of cellulose ether is cleaved by oxidation or acid is adopted.

The depolymerization process employing acid has disadvantages such as the requirement of troublesome procedures and a neutralizing agent for removing the acid employed as a catalyst after the completion of reaction, and the requirement of an acid-resistant reaction vessel. In case of a cellulose ether employed as a coating agent, the presence of a slight amount of an acid or inorganic salt is undesirable since the acid or inorganic salt tends to make the cellulose ether insoluble and to cause the discoloration of the cellulose ether, which are fatal defects as coating agent. However, it is known that sulfuric acid among common acids is readily bonded with celluloses and the removal of the bonded sulfuric acid is difficult. For this reason, there is usually adopted, as a depolymerization process employing acid, a process in which a dried powdered cellulose ether is reacted with a hydrogen halide gas such as hydrogen chloride gas according to fluidized bed process or a process in which a powdered cellulose ether in the form of a slurry in an inert organic solvent is reacted with a hydrogen halide gas in a mixing device such as rotary mixer. As to the depolymerization process in the slurry, it is known that the organic solvent employed should be inert to the starting cellulose ether and substantially anhydrous and that the presence of water or alcohol is undesirable when it is desired that the initial degree of substituent in the cellulose ether is maintained after depolymerization. However, even in the depolymerization process employing such a volatile acid, a neutralizing agent is required to remove a trace amount of the acid. Furthermore, the depolymerization process has a fatal defect that it is difficult to obtain a low viscosity cellulose ether of a high quality. That is, the low viscosity cellulose ether prepared according to the process is discolored to yellow or brown. The degree of depolymerization is non-uniform due to the depolymerization in the substantially heterogenous system. It is difficult to remove impurities from the resulting cellulose ether.

In the depolymerization process employing oxidation reaction, the oxidation is carried out by employing air or peroxide. The oxidation by air has a defect that the rate of depolymerization is small and the oxidation by peroxide is generally adopted. According to the oxidation by peroxide, it is difficult to remove the peroxide remaining in final product and side reactions tend to occur so that the degree of substitution in final product is lowered. An attempt for settling such defects is proposed in which a high viscosity cellulose ether is mixed with an aqueous solution of hydrogen peroxide and the mixture is dried at 100° to 250° C. until hydrogen peroxide is consumed completely or nearly completely (see Japanese Patent Publication No. 678/1970). However, the drying at an elevated temperature of 100° to 250° C. causes an undesirable heat deterioration which results in the discoloration and insolubilization of the final product. In order to prepare a cellulose ether for use in which such discoloration and insolubilization are undesirable, the purification of final product by which the final product is bleached and insoluble materials are removed is further required.

Such a purification process is known with respect to high viscosity cellulose ethers. That is, U.S. Pat. No. 3,549,617 describes a process in which a high viscosity cellulose ether is slurried in an aqueous solution of a lower alcohol containing sulfite ion and agitated. The purification process described in the U.S. patent is effective for a high viscosity cellulose ether which is insoluble in the aqueous solution of a lower alcohol but ineffective for a low viscosity cellulose ether, for instance, prepared by depolymerization employing hydrogen chloride since the low viscosity cellulose ether is gelled by the water in the aqueous solution or is dissolved into the aqueous solution.

As described above, the conventional depolymerization process and purification process for cellulose ethers have various problems. Therefore, when the conventional processes are applied to the depolymerization and purification of carboxymethyl ethyl cellulose being one of cellulose ethers, the same problems are encountered.

It is known that carboxymethyl ethyl cellulose is suitable as a coating agent for enteric medicaments (see U.S. Pat. Nos. 3,789,117 and 3,896,108). However, carboxymethyl ethyl cellulose employed as a coating agent for enteric mdeicaments is required to give a solution having a proper viscosity relating to its coating property and solubility to intestinal juice from view-point of practical use and to have a superior whiteness in the form of solid and a superior transparency in the form of solution from viewpoint of commercial value. There is a great demand for preparing carboxymethyl ethyl cellulose satisfying such requirements.

OBJECTS OF THE INVENTION

It is an object of the present invention to provide a process for preparing a cellulose ether of a high quality in which reaction procedures are simple and the abovementioned problems due to the heterogeneous reaction in etherification are settled.

A further object of the invention is to provide a process for preparing a low viscosity carboxymethyl ethyl cellulose by mercerizing CMC to give CMC having a low molecular weight and subjecting the mercerized CMC to etherification, in which a mercerized CMC having a low molecular weight which has a uniform distribution of alkali hydroxide, is not discolored and not contaminated with impurities is obtained in a high yield without any aging step for a long period of time, and the resulting mercerized CMC is etherified without the problems due to heterogenous reaction.

Another object of the invention is to provide a process for preparing a low viscosity carboxymethyl ethyl cellulose by depolymerizing a preformed carboxymethyl ethyl cellulose, in which a low viscosity carboxymethyl ethyl cellulose of a high quality which shows a proper low viscosity, a superior whiteness and a superior transparency is directly obtained without the non-uniformity of the degree of depolymerization and the heat deterioration, and any additional purification is not required.

These and other objects of the invention will become apparent from the description hereinafter.

BRIEF DESCRIPTION OF THE DRAWINGS

FIG. 3 is a graph showing the relationship between the time required for mercerizing or aging CMC, in which the mark ○ shows the results obtained in Example 15 and the mark ● shows the results obtained in Comparative Example 4.

DETAILED DESCRIPTION

Figure 1:
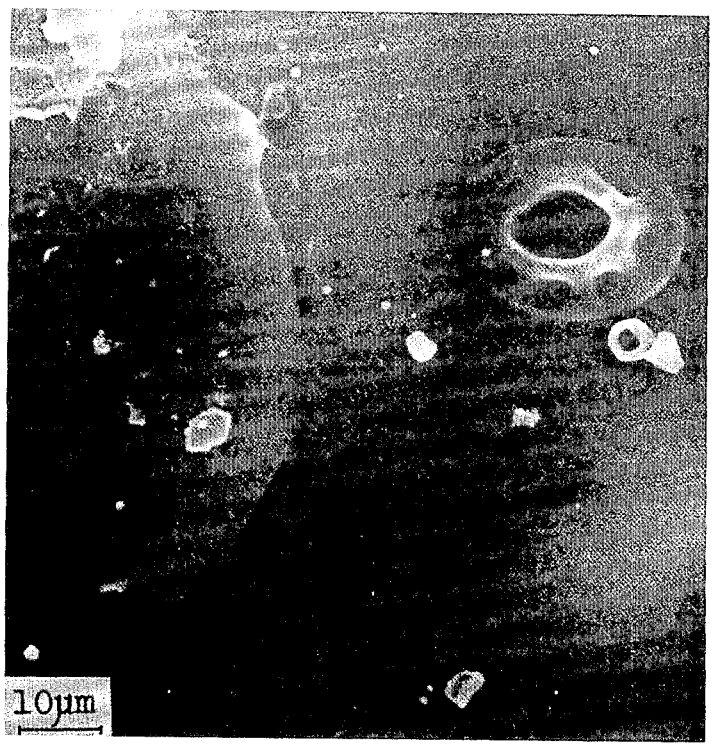
FIGS. 1 and 2 are electron micrographs of the coating films of two kinds of carboxymethyl ethyl cellulose prepared in Example 5 and Comparative Example 3, respectively.

It has now been found that the above-mentioned objects, particularly the primary object can be attained by a process for preparing a cellulose ether which comprises reacting celluloses untereated or treated with an aqueous solution of alkali hydroxide with an etherifying agent in the presence of an aqueous solution of alkali hydroxide, an organic solvent being substantially immiscible with water and capable of dissolving the etherifying agent and a quaternary salt having the following general formula:

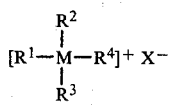
(I)

wherein M is nitrogen atom or phosphorus atom, $R^1$, $R^2$, $R^3$ and $R^4$ are independently an organic group, and $X^-$ is an anion.

The present invention is characterized in that a quaternary salt having the general formula (I) is employed as a phase transfer catalyst in etherifying celluloses. According to the present invention, the reaction system in the etherification of celluloses which is essentially heterogeneous is made more homogeneous by employing the phase transfer catalyst in compasion with the reaction system of the conventional process. That is, the phase transfer catalyst solubilizes a reactant in a phase into another phase, whereby the reaction system is brought close to homogeneous system. As a result, a cellulose ether of a high quality in which the distribution of the substituents introduced thereinto by etherification is more uniform can be readily obtained. Furthermore, according to the present invention, the problem of the conventional process that the reproducibility of the etherification reaction is poor is settled. As the alkali hydroxide employed in the etherification reaction, a less than 50 % by weight aqueous solution of alkali hydroxide which is available technically is sufficient and the etherification reaction is effected only by adding the aqueous solution of alkali hydroxide to the reaction system at an initial stage of the etherification reaction. It is not necessary to add a solid alkali hydroxide to the reaction system during the etherification reaction as in the conventional process. Thus the present invention is extremely favorable from view-points of reaction procedure and process control. Moreover, according to the present invention, it is possible to reduce the amount of an etherifying agent employed and the reaction time since the reaction system is more homogeneous, whereby a cellulose ether of a high quality can be obtained more cheaply.

When a water-soluble cellulose ether such as CMC is further reacted with an etherifying agent such as alkyl halide according to the conventional process, there frequently occurs an undesirable phenomenon that the reaction mixture is solidified during the etherification reaction to cause the local overheating of the reaction mixture due to the lowering of thermal conductivity, which results in the undesirable coloration of the resulting cellulose ether. However, such a problem can be avoided according to the present invention. Therefore, the process of the present invention is extremely favorable for preparing a cellulose ether employed as a coating agent for which the coloration of the cellulose ether is a fatal defect.

In the process of the present invention, usually celluloses are at first treated with an aqueous solution of alkali hydroxide. The aqueous solution of alkali hydroxide is preferably employed in such an amount that the amounts of alkali hydroxide and water contained in the resulting treated celluloses are from 1 to 4 times moles and from 1 to 10 times moles, respectively, per the hydroxyl groups contained in the celluloses employed as a starting material. In that case, celluloses may be immersed and mercerized in an excess of an aqueous solution of alkali hydroxide and thereafter the excess aqueous solution is removed by an appropriate means such as squeezing so that the concentrations of alkali hydroxide and water contained in the treated celluloses become the above values. Alternatively, an aqueous solution of alkali hydroxide prepared so that the concentrations of alkali hydroxide and water contained in the resulting treated celluloses become the above values may be added at the beginning to celluloses with omitting and mercerization. In case of need, a solid alkali hydroxide is added to the reaction mixture in order to adjust the concentration of alkali hydroxide. Celluloses are usually subjected to mercerization in an aqueous solution of alkali hydroxide to give alkali celluloses. The mercerization can be carried out in a conventional manner.

The preferred concentration of the aqueous solution of alkali hydroxide employed is not less than 40 % by weight and less than 50 % by weight. In case of etherifying CMC according to the conventional process, it is required to treat CMC as a starting material with a not less than 50 % by weight aqueous solution of alkali hydroxide. According to the present invention, however, the etherification is favorably carried out even in case of employing the CMC treated with a low concentrated aqueous solution of alkali hydroxide in which the concentration of alkali hydroxide is less than 50 % by weight and not less than 40 % weight.

The celluloses employed as a starting material in the present invention are represented by the following general formula:

wherein Gul is the skeleton of anhydroglucose unit represented by the chemical formula: $C_6H_7O_2$, and $R^5$ and $R^6$ are independently hydrogen atom or an organic group. In the case that $R^5$ and $R^6$ is an organic group, the general formula (II) does not mean that the degree of substitution (hereinafter referred to as "DS") of $R^5$ or $R^6$ is 1. The DS of $R^5$ or $R^6$ ranges from more than zero to 1 or more. Examples of the organic group represented by $R^5$ or $R^6$ are alkyl groups, preferably lower alkyl groups having 1 to 4 carbon atoms such as methyl and ethyl; carboxyalkyl groups, preferably carboxyalkyl groups having 2 to 4 carbon atoms such as carboxymethyl and carboxyethyl; hydroxyalkyl groups, preferably hydroxyalkyl groups having 1 to 4 carbon atoms such as hydroxymethyl, hydroxyethyl and hydroxypropyl; aminoalkyl groups, preferably (dialkylamino)alkyl groups having the general formula:

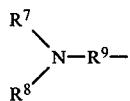

wherein $R^7$ and $R^8$ are independently alkyl group having 1 to 4 carbon atoms, and $R^9$ is alkylene group having 1 to 3 carbon atoms, such as (diethylamino)ethyl; and aralkyl groups, preferably aralkyl group having 7 to 8 carbon atoms such as benzyl. Typical examples of the celluloses are unsubstituted celluloses such as wood pulp, linter pulp, cut rayon and regenerated celluloses, and partially etherified celluloses, for instance, alkyl celluloses such as methyl cellulose and ethyl cellulose, carboxyalkyl celluloses such as carboxymethyl cellulose, hydroxyalkyl celluloses such as hydroxyethyl cellulose and hydroxypropyl cellulose, aminoalkyl celluloses such as (diethylamino)ethyl cellulose, aralkyl celluloses such as benzyl cellulose, and mixed cellulose ethers such as hydroxypropyl methyl cellulose.

The celluloses treated with an aqueous solution of alkali hydroxide in the above manner is next etherified. The etherification is preferably carried out by heating the treated celluloses in which alkali hydroxide and water are contained at the above-mentioned concentrations and an etherifying agent in the presence of an organic solvent being substantially immiscible with water and capable of dissolving the etherifying agent and a quaternary salt having the general formula (I) with agitating at a temperature of 50° to 150° C. for 2 to 25 hours.

In the process of the present invention, celluloses may be directly subjected to etherification without the treatment with an aqueous solution of alkali hydroxide. In that case, an aqueous solution of alkali hydroxide is present in the reaction system for etherification so that the amounts of alkali hydroxide and water are preferably from 1 to 4 times moles and from 1 to 10 times moles, respectively, per the hydroxyl groups contained in the celluloses employed.

In the present invention, the quaternary salt of the formula (I) is employed as a phase transfer catalyst as described previously, and as to the amount of the quaternary salt, a catalytic amount is sufficient. It is known that in etherifying celluloses with dialkyl sulfate, the etherification is carried out in an aqueous solution of quaternary ammonium salt. However, the quaternary ammonium salt is employed instead of alkali hydroxide in the prior art, and there has been no prior art that in the etherification of celluloses, the quaternary salt is employed as a phase transfer catalyst. The process of the present invention is favorable even from an economical point of view in comparison with the prior art employing the aqueous solution of quaternary ammonium salt since in the present invention the quaternary salt is employed in a catalitic amount.

The quaternary salt employed as a phase transfer catalyst in the present invention is quaternary ammonium salts or quaternary phosphonium salts represented by the general formula (I). Examples of the organic group represented by $R^1$, $R^2$, $R^3$ or $R^4$ in the general formula (I) are alkyl groups, preferably alkyl groups having 1 to 4 carbon atoms such as methyl, ethyl and propyl, and aralkyl groups, preferably aralkyl group having 7 to 8 carbon atoms such as benzyl. Examples of the anion represented by $X^-$ are halogen ions, preferably chlorine ion and bromine ion. In the case of employing etherifying agents liberating halogen ion in the reaction, such as alkyl halides, the anion may be hydroxide ion or sulfate ion since such an ion is exchanged by halogen ion. Typical examples of the quaternary salt are tetramethylammonium chloride, tetraethylammonium chloride, tetraethylammonium bromide, ethyltrimethylammonium chloride, benzyltriethylammonium chloride and tetraethylphosphonium chloride. The amount of the quaternary salt employed is a catalylic amount. Preferably the quaternary salt is employed in an amount of 0.1 to 20 % by mole, more preperably 1 to 10 % by mole based upon the hyroxyl groups contained in the celluloses employed as a starting material.

In the present invention, the quaternary salt may be prepared in situ in the reaction system. In that case, a compound capable of reacting with an excess etherifying agent to give a quaternary salt of the general formula (I) is added initially to the reaction system. Such compounds include nitrogen compounds such as ammonia, and primary, secondary or tertiary amines and phosphines which are represented by the following general formula:

wherein $R^{10}$, $R^{11}$ and $R^{12}$ are independently hydrogen atom or organic group, and M is the same as defined above. Examples of the organic group represented by $R^{10}$, $R^{11}$ or $R^{12}$ are the same as those represented by $R^1$, $R^2$, $R^3$ or $R^4$ in the general formula (I). Preferred examples of the organic groups are alkyl groups having 1 to 4 carbon atoms and benzyl. Typical examples of the amines are trimethylamine, triethylamine, benzylamine and dibenzylamine. Typical examples of the phosphines are triethylphosphine and tributylphosphine.

As the etherifying agent employed in the present invention, there are exemplified alkyl halides and aralkyl halides. Preferred Examples of the alkyl halide are alkyl chlorides having 1 to 4 carbon atoms and alkyl bromides having 1 to 4 carbon atoms such as methyl chloride, ethyl chloride, ethyl bromide and propyl bromide. Preferred examples of the aralkyl halide are aralkyl chlorides having 7 to 8 carbon atoms and aralkyl bromides having 7 to 8 carbon atoms such as benzyl chloride, benzyl bromide and phenethyl chloride. The etherifying agent is preferably employed in an amount of not less than 1.2 times moles per the hydroxyl groups contained in the celluloses employed as a starting material.

The reaction solvent employed in the present invention is an organic solvent being substantially immiscible with water and capable of dissolving the etherifying agent, and stable in the reaction. Examples of the organic solvent are aromatic hydrocarbons such as benzene, toluene, xylene and mesitylene, aliphatic hydrocarbons such as n-hexane, and halogenated hydrocarbons such as dichloromethane and trichloroethane. The organic solvent is preferably employed in an amount of 2 to 6 parts by weight per 1 part by weight of the celluloses employed as a starting material. In the present invention, the etherifying agent may be employed in large excess with serving as the reaction solvent.

The reaction mixture obtained in the etherification reaction is treated in a conventional manner to give a cellulose ether as final product.

One of cellulose ethers prepared by practicing the process of the present invention is carboxymethyl ethyl cellulose which is prepared by reacting CMC with ethyl halide. Carboxymethyl ethyl cellulose having a DS of ethyl group of 1 to 2.4 and a DS of carboxymethyl group of 0.3 to 1.2 is useful as a protective coating agent for enteric medicaments as described in U.S. Pat. No. 3,789,117. When the specific carboxymethyl ethyl cellulose is prepared according to the conventional process, there are various problems such as the poor reproducibility of the reaction and the poor quality of the resulting product, i.e. the poor solubility to solvents for coating and the difficulty in forming a continuous coating film, which defects result from the fact that the reaction system in the conventional process is an essentially heterogeneous reaction system. However, the carboxymethyl ethyl cellulose prepared according to the process of the present invention has an excellent solubility to usual solvents for coating such as mixed solvents of toluene and ethanol, dichloromethane and methanol, and ethylene glycol monoethyl ether and acetone, and forms a tough and perfectly continuous coating film.

Furthermore, the present invention provides a process for preparing a mercerised CMC having a low molecular weight, which is then etherified with an ethylating agent according to the above-mentioned etherification process of the present invention to give a low viscosity carboxymethyl ethyl cellulose of a high quality. This process is characterized by dissolving a CMC into a 30 to 70 % by weight aqueous solution of alkali hydroxide, and kneading the resulting solution in the presence of hydrogen peroxide at a temperature of 10° to 60° C. to give a mercerized CMC in the form of a soft powder or granules (hereinafter referred to merely as "powder". The particle size of the powder preferably ranges from 0.1 to 10 mm.

As the CMC employed as a starting material, commercially available CMC and CMC prepared according to any conventional process can be employed. A CMC having a DS of carboxymethyl group of not less than 0.05, preferably not less than 0.2 is suitably employed since it is good in solubility to a 30 to 70 % by weight aqueous solution of alkali hydroxide.

The CMC is dissolved into a 30 to 70 % by weight, preferably 30 to 60 % by weight aqueous solution of alkali hydroxide. The aqueous solution of alkali hydroxide is preferably employed in such an amount that the amounts alkali hydroxide and water contained in the resulting mercerized CMC are from 1 to 4 times moles and from 1 to 10 times moles, respectively, per the hydroxyl groups contained in the CMC employed as a starting material. As the alkali hydroxide, various alkali hydroxides such as sodium hydroxide and potassium hydroxide can be employed. In particular, sodium hydroxide is preferably employed from an economical point of view.

Hydrogen peroxide is added to the solution of the CMC and the resultant is then kneaded at a temperature of 10° to 60° C., preferably 30° to 50° C. When the temperature is lower than 10° C., alkali hydroxide tends to be solidified and the period for kneading is longer. When the temperature is higher than 60° C., it is difficult to obtain a mercerized CMC in the form of a soft powder and a mercerized CMC in the form of a hard mass tends to be formed. In order to prepare a mercerized CMC having a uniform distribution of alkali hydroxide in the form of a soft powder for a short kneading time, a 30 to 60 % by weight aqueous solution of sodium hydroxide and a kneading temperature of 30° to 50° C. are more preferably employed. Hydrogen peroxide as an accelerating agent for depolymerization is usually employed in an amount of 0.1 to 10 % by weight based upon the dry weight of the CMC employed as a starting material. The amount of hydrogen peroxide varies within the above range, depending upon a desired viscosity of the resulting mercerized CMC. Hydrogen peroxide is preferably employed in the form of a 30 to 35 % by weight aqueous solution. The kneading is preferably carried out by means of a kneading device such as a batch or continuous grinding type kneader for the purpose of preparing a mercerized CMC in the form of a soft powder which is employed as a starting material for the next etherification step without any grinding step.

According to the mercerization process of the present invention, for instance, a mercerized CMC giving a 1 % by weight aqueous solution of a viscosity of not more than 20 cP., particularly not more than 10 cP. can be readily obtained from a starting CMC giving a 1 % by weight aqueous solution of a viscosity of about 100 cP.

The mercerization process of the present invention has the following advantages in comparison with a conventional aging process in which a CMC is at first mercerized and then aged without employing hydrogen peroxide. According to the instant process, the reaction time is reduced by one-several tenth in comparison with the total time of the mercerizing time and the aging time in the aging process. The mercerized CMC prepared according to the instant process is in the form of a powder having a particle size of 0.1 to 10 mm., while the mercerized and aged CMC prepared according to the aging process is in the form of a mass and an additional grinding step is required to obtain a powder. According to the aging process, the yield of a CMC having a desired molecular weight is lowered by four-fifth to three-fifth in comparison with the instant process, since the depolymerization is non-uniform.

The mercerized CMC having a low molecular weight prepared according to the mercerization process of the present invention is etherified with an ethylating agent according to the above-mentioned etherification process to give a low viscosity carboxymethyl ethyl cellulose. In that case, the etherification is carried out more smoothly and unformly without forming any mass and causing any local overheating, so that a carboxymethyl ethyl cellulose in which the distribution of ethyl group is uniform is obtained without any coloration.

The characteristics of the mercerization process of the present invention are as follows: (1) The reaction steps consisting of immersing, squeezing, aging and grinding in the conventional aging process can be carried out by one step for a shorter time. (2) An aqueous solution of alkali hydroxide is added only initially to the reaction system and any squeezing step for adjusting the concentrations of alkali hydroxide and water in the resulting mercerized CMC is not required. Therefore, the process control is very easy in comparison with the conventional mercerization process consisting of immersing step and squeezing step. (3) The resulting mercerized CMC is in the form of a soft powder and has a uniform distribution of alkali hydroxide. For this reason, in etherifying the mercerized CMC, the etherification reaction proceeds uniformly to give a carboxymethyl ethyl cellulose of a high quality in which the distribution of ethyl group is uniform and of which solution is good in transparency and film-forming property. (4) Since the depolymerization of CMC is carried out in a substantially homogeneous system, the depolymerization does not proceed to excess locally, whereby the formation of CMC having an extremely short chain is prevented. As a result, the loss in purifying the carboxymethyl ethyl cellulose prepared from the mercerized CMC is reduced. (5) Since hydrogen peroxide employed as accelerating agent for depolymerization has also a bleaching action, an undesirable discoloration of the mercerized CMC is prevented.

As described above, according to the mercerization process of the present invention, a mercerized CMC having a low malecular weight in which the distribution of alkali hydroxide is uniform is obtained in the form of a soft powder by simple process. The resulting mercerized CMC is etherified to give a low viscosity carboxymethyl ethyl cellulose of a high quality. Thus the mercerization process of the present invention is important for industrial purpose.

Furthermore, the present invention provides a process for preparing a low viscosity carboxymethyl ethyl cellulose of a high quality in which a carboxymethyl ethyl cellulose prepared according to the above-mentioned etherification process of the present invention is depolymerized. This process is characterized by dissolving uniformly a carboxymethyl ethyl cellulose prepared according to the above-mentioned etherification process into an aqueous solution of a low alcohol having 1 to 4 carbon atoms, heating the resulting solution in the presence of hydrogen peroxide at a temperature of 60° C. to a reflux temperature, and precipitating the resulting low viscosity carboxymethyl ethyl cellulose by removing the alcohol.

The present inventors, taking notice of the fact that carboxymethyl ethyl cellulose is not readily soluble in water alone or in a lower alcohol having 1 to 4 carbon atoms alone but readily soluble in a mixed solvent of both, have found out that when the solution of carboxymethyl ethyl cellulose prepared by dissolving it uniformly into the mixed solvent is heated with hydrogen peroxide, the depolymerization of carboxymethyl ethyl cellulose proceeds uniformly and the bleaching treatment and purification treatment are carried out at the same time, and the DS of the substituents is not lowered.

According to the depolymerization process of the present invention, the depolymerization, the bleaching treatment and the purification treatment are carried out by one step and the depolymerization is carried out in a homogeneous system, so that a low viscosity carboxymethyl ethyl cellulose of a high quality can be obtained economically.

In the depolymerization process of the present invention, a high viscosity carboxymethyl ethyl cellulose is at first dissolved into an aqueous solution of a lower alcohol having 1 to 4 carbon atoms. As the high viscosity carboxymethyl ethyl cellulose, a carboxymethyl ethyl cellulose prepared according to the above-mentioned etherification process of the present invention is most preferably employed to prepared a final product of a uniform quality but any carboxymethyl ethyl cellulose prepared by any other process may be employed as far as it is dissolved into the aqueous solution of a lower alcohol having 1 to 4 carbon atoms. Examples of the lower alcohol are methanol, ethanol and isopropyl alcohol. The ratio of the lower alcohol to water in the reaction system is not particularly limited as far as the high viscosity carboxymethyl ethyl cellulose employed as a starting material is dissolved uniformly. Generally, however, the ratio of the lower alcohol to water in the reaction system after hydrogen peroxide is added is selected from a range of 95:5 to 70:30 by weight since the mixed solvent in this range has a high solvent power to a high viscosity carboxymethyl ethyl cellulose.

The obtained solution of a carboxymethyl ethyl cellulose is then heated with hydrogen peroxide. The amount of hydrogen peroxide ranges preferably from 0.1 to 50% by weight, more preferably from 1 to 30% by weight based upon the dry weight of the carboxymethyl ethyl cellulose employed as a starting material. Hydrogen peroxide is usually employed in the form of a 30 to 50% by weight aqueous solution. In order to raise the rate of depolymerization, an acid catalyst such as sulfuric acid, perchloric acid or sulfonic acids may be employed in an amount of 0.1 to 5% by weight based upon the total weight of the reaction mixture. However, the employment of such an acid catalyst should be avoided when a final product giving a transparent solution is required or a decrease in the DS of the substituents should be avoided. In the depolymerization process of the present invention, it is essential to carry out the depolymerization reaction in a uniform solution. If the depolymerization reaction is carried out in a heterogeneous system such as slurry, the object of the present invention cannot be attained since the depolymerization of a carboxymethyl ethyl cellulose does not proceed effectively and the gelation of the reaction mixture occurs. The reaction temperature is from 60° C. to the reflux temperature of the reaction mixture. A reaction temperature of lower than 60° C. is not practical since the rate of reaction is too small. In particular, the reaction at the reflux temperature of the reaction mixture is suitable since the temperature control during the reaction is easy. The feed concentration of the carboxymethyl ethyl cellulose in the reaction mixture varies widely but practically ranges from 5 to 50% by weight. Since the reaction mixture is a uniform solution, the degree of depolymerization can be controlled by determining the viscosity of reaction mixture during the reaction. It is one of the advantages of the depolymerization process of the present invention that the accurate determination of the degree of depolymerization is possible.

After the completion of the reaction, the alcohol is removed to precipitate the resulting low viscosity carboxymethyl ethyl cellulose. In that case, the neutralization of the reaction mixture is unnecessary. In case of need, the reaction mixture is at first filtered through a filter and then subjected to the separation of the product, whereby the removal of impurities is more effectively achieved to yield a carboxymethyl ethyl cellulose giving a more transparent solution.

Possibly the separation of the resulting carboxymethyl ethyl cellulose from the reaction mixture is carried out by a common process for separating a polymer from its solution, i.e. a process in which the polymer solution is poured into a large amount of a precipitating agent (for instance, water in case of carboxymethyl ethyl cellulose). However, such a process is uneconomical since the recovery of the alcohol is difficult.

In the depolymerization process of the present invention, the separation of the low viscosity carboxymethyl ethyl cellulose from the reaction mixture is preferably carried out by a process in which a large portion of the alcohol is removed from the reaction mixture, for instance, by distillation to lower the concentration of the alcohol in reaction mixture, whereby the low viscosity carboxymethyl ethyl cellulose being insoluble in water is precipitated in the form of granules or finely devided powder, and the precipitate is filtered off and dried. In recovering the alcohol from the reaction mixture by distillation, the reaction mixture may be directly distilled but it is better to add water to the reaction mixture before or during distillation. The amount of water added is from 0.1 to 3 parts by weight per 1 part by weight of the reaction mixture. When water is added during distillation, it may be added in one portion or in two or more portions.

The present invention is more particularly described and explained by means of the following Examples to which the present invention is not limited. In Examples, % is % by weight unless otherwise noted.

The methods for tests in Examples are as follows:

(1) Solubility

One g. of a sample was dissolved into 19 g. of the solvent defined in each Example. The resulting solution was observed by the naked eye.

(2) Transmittance (i) Examples 1 to 14

One g. of a dry sample was dissolved into 19 g. of methanol to give a 5% solution of the sample in methanol. The transmittance of the solution was determined on a photoelectric colorimeter at a room temperature with employing a cell having a light pass length of 20 mm. and methanol as reference solution.

(ii) Examples 15 to 28

One g of a dried sample (carboxymethyl ethyl cellulose) was dissolved into 19 g. of a mixed solvent of ethanol and dichloromethane (1:1 by weight) to give a 5% solution of the sample. The transmittance of the solution was determined on a photoelectric colorimeter at a room temperature with employing a cell having a light pass length of 10 mm. and the same solvent as employed for preparing the solution as reference solution.

(3) Film-forming Property

The solution obtained in Test (1) was applied to a glass plate and dried at 80° C. for 30 minutes to give a film having a thickness of about 50μ. The obtained film was observed by the naked eye.

(4) Disintegrating Property

The coated glass plate obtained in Test (3) was dipped into the first liquid (artificial gastric juice) or the second liquid (artificial intestinal juice) which is provided in the disintegration test according to the Japanese Pharmacopoeia (the 9th revision), at 37° C. ±1° C. The state of the film was observed by the naked eye.

(5) Viscosity of CMC

CMC was washed with an 80% aqueous solution of methanol which was kept at 60° C. until the pH value of the washing became about 7, and was dried in vacuo at 60° C. until a constant weight was reached. A 1% aqueous solution of the purified CMC was prepared by dissolving the CMC into water. The viscosity of the aqueous solution was determined at 25° C. by a B type viscometer.

(6) Viscosity of Carboxymethyl Ethyl Cellulose

A carboxymethyl ethyl cellulose was dried in a hot air oven at 105° C. for 2 hours. A 5% solution of the dried product was prepared by dissolving it into an 80% aqueous solution of ethanol. the viscosity of the solution was determined at 25° C. by a B type viscometer.

(7) Viscosity of Reaction Mixture

With respect to 200 ml. of reaction mixture taken out of the reaction vessel, the viscosity was determined at 25° C. by a B type viscometer.

(8) Whiteness of Carboxymethyl Ethyl Cellulose

The reflectance of a finely devided carboxymethyl ethyl cellulose which passed through a 200 meshsieve was determined at 480 mμ on a spectrophotometer with employing a standard clay as standard white surface.

EXAMPLE 1

Into a grinding type kneader were placed 90 g. of a cut rayon having a length of 0.5 to 0.6 mm. (available under the commercial name "CELLCUT" made by Kohjin Co., Ltd., the content of cellulose: about 90%), 54.5 g. of a 48% aqueous solution of sodium hydroxide and 107.5 g. of a granular sodium hydroxide. The mixture was mercerized at a room temperature for 2 hours.

The mercerized cut rayon was placed into a 1 liter autoclave with 400 g. of toluene and 7.4 g. of tetraethylammonium chloride, and 242 g. of ethyl chloride was added to the mixture with agitating vigorously under a reduced pressure. After addition of ethyl chloride, the resulting mixture was heated with agitating at 104° to 114° C. for 18 hours. After cooled, the reaction mixture was adjusted to about pH 6 with 12 N sulfuric acid and a large portion of the solvent was recovered by distillation. The resultant was washed with water and dried to give 106 g. of ethyl cellulose.

The obtained ethyl cellulose had a DS of ethyl group of 2.45. The ethyl cellulose was completely dissolved into xylene, methanol, butanol or acetone and no insoluble material was observed. The transmittance of a 1% solution of the ethyl cellulose in methanol was 87.5%.

COMPARATIVE EXAMPLE 1

The same procedures as in Example 1 except that tetraethylammonium chloride was not employed were repeated to give 98 g. of ethyl cellulose.

The obtained ethyl cellulose had a DS of ethyl group of 2.30. When the ethyl cellulose was dissolved into xylene, methanol, butanol or acetone, considerable amounts of insoluble materials were observed. The transmittance of a 1% solution of the ethyl cellulose in methanol was 26.5%.

EXAMPLE 2

The same procedures as in Example 1 except that a waste regenerated cellulose film cut into pieces having a dimension of 5 mm.×5 mm. (the content of cellulose: about 80%) was employed instead of the cut rayon and the reaction temperature for esterification was changed to a temperature of 104° to 110° C. were repeated to give 103 g. of ethyl cellulose.

The obtained ethyl cellulose had a DS of ethyl group of 2.40. The ethyl cellulose was completely dissolved into xylene, methanol, butanol or acetone and no insoluble material was observed. The transmittance of a 1% solution of ethyl cellulose in methanol was 85.2%.

EXAMPLE 3

Ninety g. of the same cut rayon as employed in Example 1 was mercerized under the same conditions as in Example 1. The mercerized cut rayon was placed into a 1 liter autoclave with 400 g. of toluene and 6.2 g. of tetraethylammonium chloride, and 150 g. of methyl chloride was added to the mixture with agitating vigorously under a reduced pressure. After addition of methyl chloride, the resulting mixture was heated with agitating at 80° to 90° C. for 12 hours. After cooled, the reaction mixture was adjusted to about pH 6 with 12 N sulfuric acid and a large portion of the solvent was recovered by distillation. The resultant was washed with a hot water and dried to give 88.3 g. of methyl cellulose.

The obtained methyl cellulose had a DS of methyl group of 1.85. The methyl cellulose was completely dissolved into a cold water and no insoluble material was observed.

EXAMPLE 4

Into a grinding type kneader were placed 90 g. of the same cut rayon as employed in Example 1 and 270 g. of a 48% aqueous solution of sodium hydroxide. The mixture was mercerized at a room temperature for 2 hours.

The mercerized cut rayon, 400 g. of toluene, 365 g. of benzyl chloride and 7.4 g. of tetraethylammonium chloride were placed into a 2 liter three-necked flask equipped with a reflux condenser and heated at 90° to 110° C. for 8 hours. After cooled, the reaction mixture was adjusted to about pH 6 with 12 N sulfuric acid and a large portion of the solvent was recovered by distillation. The resultant was washed with water and with methanol and dried to give 159 g. of benzyl cellulose.

The obtained benzyl chloride had a DS of benzyl group of 2.1. The benzyl cellulose was completely dissolved into toluene and no insoluble material was observed.

EXAMPLE 5

One hundred g. of a dissolving pulp was placed into a grinding type kneader with 67.5 g. of a 40% aqueous solution of sodium hydroxide and 200 g. of a mixed solvent of ethanol and toluene (65: 35 by weight), and was immersed at 20° to 25° C. for an hour and then crushed with agitating at 23° to 25° C. for 1.5 hours. To the resultant was added 30 g. of monochloroacetic acid. The mixture was agitated at 23° to 25° C. for 50 min. and then at 50° to 65° C. for 2 hours. The solvent was recovered by distillation and the resulting CMC was dried at 40° to 50° C. in a hot air oven until the water content thereof was 9.2%. The obtained CMC is mainly in the form of sodium salt.

The CMC, 270 g. of a 48% aqueous solution of sodium hydroxide, 400 g. of toluene and 4.25 g. of tetraethylammonium chloride were placed into a 1 liter autoclave, and 255 g. of ethyl chloride was added to the mixture under a reduced pressure. After addition of ethyl chloride, the resulting mixture was heated with agitating at about 110° C. for 20 hours. After cooled, the reaction mixture was filtered with suction and a large portion of the solvent was recovered by distillation to give a granular sodium carboxymethyl ethyl cellulose. The sodium salt was poured into 500 g. of water and the resultant was adjusted to about pH 2 with 12 N sulfuric acid to give a precipitate. The precipitate was filtered off to give a granular carboxymethyl ethyl cellulose. The crude product was sufficiently washed with a hot water of 50° to 60° C. and dried at 70° C. in a hot oven until a constant weight was reached to give 107 g. of a purified carboxymethyl ethyl cellulose.

The obtained carboxymethyl ethyl cellulose had a DS of carboxymethyl group of 0.42 and a DS of ethyl group of 2.18. The product was completely dissolved into ethanol-water (80:20 by weight), toluene-ethanol (80: 20 by weight) or methylene chloride-ethanol (50:50 by weight) to give uniform, transparent solutions and no insoluble material was observed. The dry film prepared from each solution was colorless and transparent, smooth and tough. When the film was dipped into the artificial gastric juice for 2 hours, no change was observed, while the film was smoothly dissolved into the artificial intestinal juice.

A 5% solution of the product in a mixed solvent of methylene chloride and ethanol (50:50 by weight) was applied to a glass plate and dried at 70° C. for 30 min. to give a film having a thickness of about 50μ. The film was photographed through a scanning electron microscope (JSM-U3 made by Nihon Denshi Kabushiki Kaisha) in a usual manner. The obtained electron micrograph magnified 2,000 times is shown in FIG. 1. As is clear from FIG. 1, the film obtained from the carboxymethyl ethyl cellulose prepared according to the process of the present invention was an extremely uniform and continuous film.

EXAMPLE 6

The same procedures as in Example 5 except that 11 g. of tetraethylammonium bromide was employed instead of tetraethylammonium chloride were repeated to give 105 g. of a purified carboxymethyl ethyl cellulose.

The obtained product had a DS of carboxymethyl group of 0.42 and a DS of ethyl group of 2.35. The results of the tests for solubility, film-forming property and disintegrating property were as favorable as in Example 5.

EXAMPLE 7

Employing 400 g. of a dissolving pulp, 270 g. of a 40% aqueous solution of sodium hydroxide, 800 g. of a mixed solvent of ethanol and toluene (65:35 by weight) and 120 g. of monochloroacetic acid, sodium CMC was prepared in the same manner as in Example 5. The sodium CMC was washed with a mixed solvent of methanol and water (80:20 by weight) of 70° C. until the pH value of the washing became about 7, whereby the sodium ion was removed, and was dried at 70° C. until the water content was 5.5% to give a purified CMC.

Eighty g. of the purified CMC (as pure CMC) was immersed into 400 g. of a 48% aqueous solution of sodium hydroxide and mercerized at 25° C. for 20 hours. The resultant was squeezed by a squeezer until the squeeze ratio (weight ratio of the mercerized CMC after squeezed to the CMC supplied) because 3.7, whereby the contents of sodium hydroxide and water were adjusted.

The mercerized CMC, 400 g. of benzene and 3.21 g. of triethylamine were placed into a 1 liter autoclave, and 170.5 g. of ethyl chloride was added to the mixture with agitating vigorously under a reduced pressure. After addition of ethyl chloride, the resulting mixture was heated with agitating at 105° to 120° C. for 20 hours. After the completion of the reaction, a large portion of the solvent was recovered by distillation. The resultant was agitated with 240 g. of a pure water at a room temperature for 2 hours and thereafter adjusted to about pH 2 with 12 N sulfuric acid to give a granular carboxymethyl ethyl cellulose. The crude product was treated in the same manner as in Example 5 to give 86 g. of a purified carboxymethyl ethyl cellulose.

The obtained product had a DC of carboxymethyl group of 0.422 and a DS of ethyl group of 2.05. The results of the tests for solubility, film-forming property and disintegrating property were as favorable as in Example 5.

EXAMPLE 8

Into a grinding type kneader were placed 80 g. (as pure CMC) of the purified CMC prepared in Example 7 and 216 g. of a 48% aqueous solution of sodium hydroxide. The mixture was agitated at 30° to 46° C. for 45 min. to give a mercerized CMC.

The mercerized CMC was etherified in the same manner as in Example 7 except that the reaction temperature was changed to a temperature of 105° to 115° C. and the reaction time was changed to 18 hours, and the resulting crude product was purified in the same manner as in Example 7 to give 90.4 g. of a purified carboxymethyl ethyl cellulose.

The obtained product had a DS of carboxymethyl group of 0.42 and a DS of ethyl group of 2.10. The results of the tests for solubility, film-forming property and disintegrating property were as favorable as in Example 5.

EXAMPLE 9

The same procedure as in Example 8 except that 6.2 g. of a 30% aqueous solution of trimethylamine was employed instead of triethylamine and 320 g. of toluene was employed as a reaction solvent instead of benzene to give 90 g. of purified carboxymethyl ethyl cellulose.

The obtained product had a DS of carboxymethyl group of 0.42 and a DS of ethyl group of 2.08. The results of the tests for solubility, film-forming property and disintegrating property were as favorable as in Example 5.

EXAMPLE 10

The same procedure as in Example 9 except that 5.6 g. of benzylamine was employed instead of the aqueous solution of trimethylamine, and the reaction temperature and the reaction time for etherification were changed to a temperature of 96° to 114° C. and 20.5 hours, respectively, were repeated to give 75.2 g. of a purified carboxymethyl ethyl cellulose.

The obtained product had a DS of carboxymethyl group of 0.42 and a DS of ethyl group of 1.91. The results of the tests for solubility, film-forming property and disintegrating property were as favorable as in Example 5.

EXAMPLE 11

Two hundreds g. of a dissolving pulp was carboxymethylated in the same manner as in Example 5 except that the amounts of the 40% aqueous solution of sodium hydroxide, monochloroacetic acid and the mixed solvent of ethanol and toluene were changed to 174.4 g., 70 g. and 800 g., respectively, to give a sodium CMC. The sodium CMC was purified in the same manner as in Example 7 to give a purified CMC having a water content of 5.0%. One hundred g. (as pure CMC) of the purified CMC was placed into a grinding type kneader with 270 g. of a 48% aqueous solution of sodium hydroxide and mercerized at 30° to 46° C. for 45 min.

The mercerized CMC, 350 g. of toluene and 6.75 g. of a 30% aqueous solution of trimethylamine were placed into a 1 liter autoclave, and 220 g. of ethyl chloride was added to the mixture under a reduced pressure. The resulting mixture was heated with agitating at 105° to 115° C. for 18 hours. The obtained crude product was purified in the same manner as in Example 7 to give 98 g. of a purified carboxymethyl ethyl cellulose.

The obtained product had a DS of carboxymethyl group of 0.60 and a DS of ethyl group of 1.95. The results for the tests for solubility, film-forming property and disintegrating property were as favorable as in Example 5.

EXAMPLE 12

Two hundreds g. of a dissolving pulp was carboxymethylated in the same manner as in Example 5 except that the amounts of the 40% aqueous solution of sodium hydroxide, monochloroacetic acid and the mixed solvent of ethanol and toluene were changed to 162 g., 61 g. and 800 g., respectively, to give a sodium CMC. The sodium CMC was purified in the same manner as in Example 7 to give a purified CMC having a water content of 5.5%.

One hundred g. (as pure CMC) of the purified CMC was placed into a grinding type kneader with 200 g. of a 48% aqueous solution of sodium hydroxide and mercerized at 30° to 48° C. for 45 min.

The mercerized CMC, 350 g. of toluene, 7.3 g. of a 30% aqueous solution of trimethylamine and 36 g. of a granular sodium hydroxide were placed into a 1 liter autoclave and 212 g. of ethyl chloride was added to the mixture under a reduced pressure. The resulting mixture was heated with agitating at 102° to 115° C. for 18 hours. After the completion of the reaction, a large portion of the solvent was recovered by distillation. The resultant was agitated with 300 g. of a pure water for 2 hours and thereafter was adjusted to about pH 2 with 12 N sulfuric acid to give a granular carboxymethyl ethyl cellulose. The crude product was sufficiently washed with a hot water of 50° to 60° C. and dried at 70° C. to give 115 g. of a purified carboxymethyl ethyl cellulose.

The obtained product had a DS of carboxymethyl group of 0.50 and a DS of ethyl group of 2.20. The results of the tests for solubility, film-forming property and disintegrating property were as favorable as in Example 5.

EXAMPLE 13

A dissolving pulp was carboxymethylated and purified in the same manner as in Example 7 to give a purified CMC having a water content of 6.0%. Eighty g. (as pure CMC) of the purified CMC was placed into a grinding type kneader with 216 g. of a 42% aqueous solution of sodium hydroxide and mercerized at 30° to 46° C. for 45 min.

The mercerized CMC, 400 g. of toluene and 5.8 g. of a 30% aqueous solution of trimethylamine were placed into a 1 liter autoclave, and 170.5 g. of ethyl chloride was added to the mixture under a reduced pressure. The resulting mixture was heated with agitating at 100° to 113° C. for 18 hours. The obtained crude product was purified in the same manner as in Example 5 to give 84.0 g. of a purified carboxymethyl ethyl cellulose.

The obtained product had a DS of carboxymethyl group of 0.42 and a DS of ethyl group of 2.10. The results of the tests for solubility, film-forming property and disintegrating property were as favorable as in Example 5.

EXAMPLE 14

A dissolving pulp was carboxymethylated and purified in the same manner as in Example 7 to give a purified CMC having a water content of 6.0%. Eighty g. (as pure CMC) of the purified CMC was placed into a grinding type kneader with 208 g. of a 45% aqueous solution of sodium hydroxide and mercerized at 30° to 46° C. for 45 min.

The mercerized CMC was etherified in the same manner as in Example 13 except that the reaction temperature and the reaction time were changed to a temperature of 105° to 120° C. and 17 hours, respectively, to give 85.0 g. of a purified carboxymethyl ethyl cellulose.

The obtained product had a DS of carboxymethyl group of 0.42 and a DS of ethyl group of 2.18. The results of the tests for solubility, film-forming property and disintegrating property were as favorable as in Example 5.

COMPARATIVE EXAMPLE 2

Eighty g. (as pure CMC) of the purified CMC prepared in Example 7 was mercerized and etherified in the same manner as in Example 7 except that triethylamine was not employed. After cooled, the resulting reaction mixture was filtered to give a sodium salt of carboxymethyl ethyl cellulose being solidified gummy. The sodium salt was treated in the same manner as in Example 5 to give 75.2 g. of purified carboxymethyl ethyl cellulose having a DS of carboxymethyl group of 0.42 and a DS of ethyl group of 1.95.

When the obtained prodcut was dissolved into ethanol-water (80:20 by weight), toluene-ethanol (80:20 by weight) or methylene chloride-ethanol (50:50 by weight), considerable amounts of insoluble materials were observed in each resulting solution and the solution was tinged with yellowish orange. The dry film prepared from each solution was not a continuous film but a discontinuous film being squamous or cracked.

In order to prepare a continuous film having the same quality as the films prepared from the carboxymethyl ethyl celluloses of Examples 5 to 14 by employing the carboxymethyl ethyl cellulose of this Comparative Example, it was necessary to employ triacetin as a plasticizing agent in an amount of not less than 10% based upon the weight of the carboxymethyl ethyl cellulose.

COMPARATIVE EXAMPLE 3

The same procedures as in Example 5 except that tetraethylammonium chloride was not employed were repeated to give a crude sodium carboxymethyl ethyl cellulose. The sodium salt was solidified gummy as that of Comparative Example 2. The sodium salt was treated in the same manner as in Example 5 to give 95 g. of a purified carboxymethyl ethyl cellulose.

The obtained product had a DS of carboxymethyl group of 0.42 and a DS of ethyl group of 2.05. When the product was dissolved into ethanol-water (80:20 by weight), toluene-ethanol (80:20 by weight) or methylene chloride-ethanol (50:50 by weight), considerable amounts of insoluble materials were observed in each resulting solution and the solution was tinged with yellowish orange. The dry film prepared from each solution was as insufficient in quality as that in Comparative Example 2.

In order to prepare a continuous film having the same quality as the films prepared from the carboxymethyl ethyl celluloses of Examples 5 to 14 by employing the carboxymethyl ethyl cellulose of this Comparative Example, it was necessary to employ triacetin as a plasticizing agent in an amount of not less than 10% based upon the weight of carboxymethyl ethyl cellulose.

Figure 2:
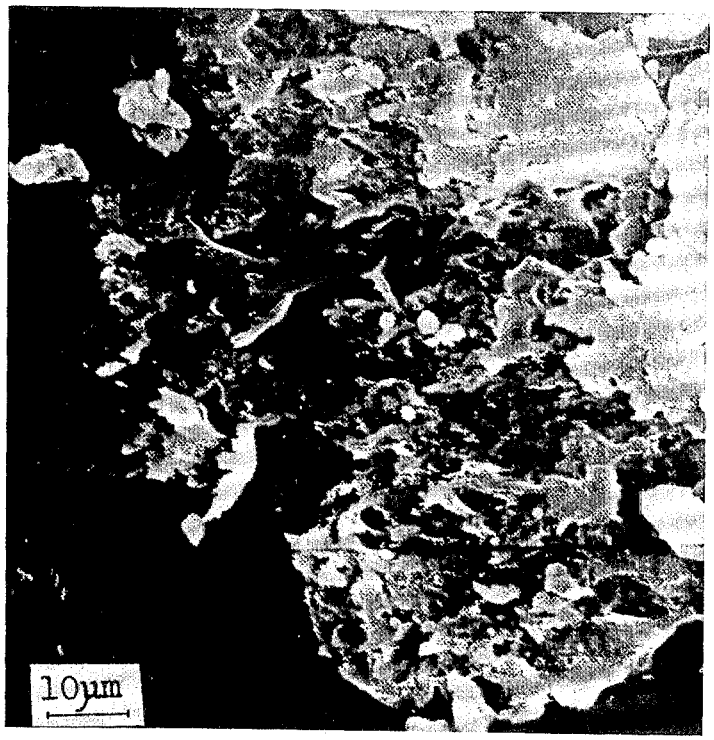

Employing the carboxymethyl ethyl cellulose of this Comparative Example, a film having a thickness of about 50μ was prepared and photographed in the same manner as in Example 5. The obtained electron micrograph magnified 2,000 times is shown in FIG. 2. As is clear from FIG. 2, the film prepared from the carboxymethyl ethyl cellulose of this Comparative Example was a non-uniform and discontinuous film, differing from the completely continuous film prepared from the carboxymethyl ethyl cellulose of Example 5.

EXAMPLE 15

Into a griding type kneader equipped with double arms was placed 540 g. of a 48% aqueous solution of sodium hydroxide. To the solution kept at 30° C. was added 208.3 g. of a powdered CMC having a DS of carboxymethyl group of 0.42, a viscosity of 90 cP., a purity of 96.0% and a water content of 3.6%, and the CMC was completely dissolved therein. The resulting solution was mixed with 5.7 g. of a 35% aqueous solution of hydrogen peroxide and kneaded. Since heat was generated as the reaction proceeded, the reaction mixture was kept at a temperature of not more than 48° C. by cooling. After 20 min. for the addition of hydrogen peroxide, the reaction mixture changed from a homogeneous state to a dumpling-like mass. After about 40 min. from the addition of hydrogen peroxide, the mass noted in Table 1 to give a mercerized CMC in the form of a soft powder. Each mercerized CMC obtained was etherified in the same manner as in Example 15 to give a carboxymethyl ethyl cellulose. Results are shown in Table 1.

All carboxymethyl ethyl celluloses obtained had as a superior solubility and gave as a superior film as that of Example 15.

TABLE 1

| Example | Starting CMC | | | | Amount of starting CMC (g.) | Aqueous solution of sodium hydroxide | | Aqueous solution of hydrogen peroxide | |
|---|---|---|---|---|---|---|---|---|---|
| | DS of carboxymethyl group | Viscosity (cP.) | Purity (%) | Water content (%) | | Conc. (%) | Amount (g.) | Conc. (%) | Amount (g.) |
| 16 | 0.42 | 90 | 96.0 | 3.6 | 208.3 | 48 | 540 | 35 | 4.3 |
| 17 | 0.42 | 90 | 96.0 | 3.6 | 208.3 | 48 | 540 | 35 | 2.9 |
| 18 | 0.39 | 90 | 96.0 | 3.6 | 208.3 | 42 | 560 | 35 | 4.3 |
| 19 | 0.50 | 70 | 93.6 | 5.5 | 213.7 | 50 | 510 | 35 | 4.3 |
| 20 | 0.50 | 70 | 93.6 | 5.5 | 213.7 | 54 | 500 | 35 | 4.3 |
| 21 | 0.60 | 85 | 94.1 | 5.0 | 212.5 | 48 | 500 | 35 | 4.3 |
| 22 | 0.42 | 120 | 95.0 | 4.2 | 210.5 | 48 | 540 | 35 | 17.1 |

| Example | Mercerizing temperature (°C.) | Time till soft powdery mercerized CMC is obtained (min.) | Overall mercerizing time (hour) | Viscosity of mercerized CMC (cP.) | Carboxymethyl ethyl cellulose | |
|---|---|---|---|---|---|---|
| | | | | | DS of ethyl group | Viscosity (cP.) |
| 16 | 30 to 48 | 45 | 1 | 9.2 | 2.10 | 54 |
| 17 | 20 to 45 | 50 | 1 | 11.5 | 2.00 | 65 |
| 18 | 30 to 47 | 50 | 1 | 9.5 | 2.20 | 46 |
| 19 | 30 to 50 | 40 | 1 | 6.5 | 2.00 | 13.8 |
| 20 | 20 to 47 | 45 | 1 | 6.3 | 2.03 | 13 |
| 21 | 30 to 48 | 40 | 1 | 8.7 | 1.96 | 30 |
| 22 | 30 to 55 | 30 | 1 | 4.2 | 2.10 | 10.5 | changed to a soft powder having a particle size of about 1 mm. The overall mercerization time was an hour from the addition of hydrogen peroxide. The obtained mercerized CMC had a viscosity of 7.0 cP.

Into a 1 liter autoclave were added 377 g. of the soft powder CMC, 400 g. of toluene and 5 g. of tetraethylammonium chloride. To the mixture was added with agitating vigorously 170.5 g. of ethyl chloride. Immediately after the addition of ethyl chloride, the resulting mixture became a uniform slurry and was then heated with agitating at 110° to 120° C. for 18 hours. After the completion of reaction, a large portion of the solvent was recovered by distillation. The resultant was agitated with 240 g. of a pure water at a room temperature for 2 hours and thereafter adjusted to about pH 2 with 12 N sulfuric acid to give a granular carboxymethyl ethyl cellulose. The crude product was washed with a hot water of 50° to 60° C. until the pH value of washing was about 7 and dried at 70° C. in a hot air oven until a constant weight was reached to give 108 g. of a granular purified carboxymethyl ethyl cellulose.

The obtained product had a DS of carboxymethyl group of 0.42, a DS of ethyl group of 2.20 and a whiteness of 88.5%. The product was completely dissolved into methylene chloride-ethanol (50:50 by weight) or ethanol-water (80:20 by weight). The dry film prepared from each solution was colorless and transparent, smooth and tough. The product had a viscosity of 15.0 cP. and a transmittance of 90.0%.

The same CMC was employed above was mercerized under the same conditions as above. The relationship between the mercerization time and the viscosity of the resulting mercerized CMC is shown in FIG. 3.

EXAMPLES 16 to 22

Each of the CMCs shown in Table 1 was mercerized in the same manner as in Example 15 unless otherwise

COMPARATIVE EXAMPLE 4

Into a 2 liter glass beaker was placed 1,400 g. of a 48% aqueous solution of sodium hydroxide. To the solution kept at 30° C. was added 208.3 g. of the same CMC as employed in Example 15, and the CMC was completely dissolved therein. The beaker was placed in a thermostat kept at 30° C. and the mercerization was carried out for 5 hours. The resulting mercerized CMC was an elastic mass having no fluidity. The mercerized CMC was squeezed by a squeezer under a pressure of 450 to 500 kg./cm.$^2$ for 30 min. to give a massive mercerized CMC having a squeeze ratio of 3.73. The mercerized CMC was an elastic soft mass and had a viscosity of 70 cP.

The mercerized CMC was ground into particles having a particle size of 1 to 5 mm. and thereafter aged at 25° C. for 95 hours in a temperature controlled room to give a mercerized CMC having a viscosity of 8.5 cP.

Employing 373 g. of the mercerized CMC, the etherification with ethyl chloride was carried out in the same manner as in Example 15 except that the reaction time was changed to 21 hours. Before the reaction mixture gave a uniform slurry, a local overheating occurred due to non-uniform heat conduction, which resulted in a local coloration of the reaction mixture in reddish brown. The resulting reaction mixture was treated in the same manner as in Example 15. In that case, the crude product contained large amounts of components being soluble in a hot water of 50° to 60° C., yielding only 88.7 g. of a granular purified carboxymethyl ethyl cellulose.

The obtained product had a DS of carboxymethyl group of 0.42, a DS of ethyl group of 2.00, a whiteness of 75% and a viscosity of 68 cP.

The same mercerized CMC as obtained above was aged under the same conditions as above. The relationship between the aging time and the viscosity of the resulting aged CMC is shown in FIG. 3.

EXAMPLE 23

Into a 2 liter three-necked separable flask equipped with an agitator, a condenser and a thermometer were placed 100 g. of the carboxymethyl ethyl cellulose obtained in Example 8 which had a DS of carboxymethyl group of 0.42, a DS of ethyl group of 2.10, a viscosity of 1,200 cP., a whiteness of 70% and a transmittance of 45%, 688 g. of ethanol and 172 g. of water. The carboxymethyl ethyl cellulose was completely dissolved into the mixed solvent at 70° C. To the resulting solution was added 40 g. of a 35% aqueous solution of hydrogen peroxide. The mixture was heated under reflux for 6 hours, whereby the viscosity of the reaction mixture was decreased from 2,700 cP. to 18 cP. The reaction mixture was filtered through a filter cloth made of Pylene 9A (commercial name of a polypropylene fiber made by Mitsubishi Rayon Co., Ltd.).

The filtrate was placed into a 2 liter three-necked flask equipped with an agitator, a condenser and a thermometer, and 600 ml. of water was added thereto with agitating. The ethanol was recovered by simple distillation under an atmospheric pressure until the inner temperature of the flask was raised to 98° C. to precipitate a carboxymethyl ethyl cellulose. The precipitate was filtered off, sufficiently washed with a hot water and dried at 70° C. until a constant weight was reached to give 92 g. of a purified low viscosity carboxymethyl ethyl cellulose.

The obtained low viscosity carboxymethyl ethyl cellulose had a viscosity of 10.1 cP., a whiteness of 94.0% and a transmittance of 98.5%. The product had a DS of carboxymethyl group of 0.42 and a DS of ethyl group of 2.10 and there was not observed any lowering in the DS of the substituents due to the depolymerization.

EXAMPLE 24

Into a grinding type kneader equipped with double arms was placed 540 g. of a 48% aqueous solution of sodium hydroxide. To the solution kept at 30° C. was added 208 g. of a powdered CMC having a DS of carboxymethyl group of 0.50, a viscosity of 90 cP., a purity of 96.0% and a water content of 3.6%, and the CMC was uniformly dissolved. The resultant was kneaded for about 40 min. to give a coarse granular mercerized CMC. The mercerized CMC was aged at a room temperature for two days.

Employing 377 g. of the aged CMC, 400 g. of toluene, 5 g. of tetraethylammonium chloride and 210 g. of ethyl chloride, the etherification was carried out in the same manner as in Example 5 to give a carboxymethyl ethyl cellulose having a DS of carboxymethyl group of 0.50, a DS of ethyl group of 2.10, a viscosity of 250 cP., a whiteness of 70% and a transmittance of 50%.

Into the same flask as employed in Example 23 were placed 100 g. of the carboxymethyl ethyl cellulose, 704 g. of isopropyl alcohol and 176 g. of water. The carboxymethyl ethyl cellulose was completely dissolved into the mixed solvent at 70° C. To the resulting solution was added 20 g. of a 35% aqueous solution of hydrogen peroxide, and the mixture was heated under reflux for 3 hours, whereby the viscosity of the reaction mixture was decreased from 670 cP. to 98 cP. The reaction mixture was filtered through a filter cloth made of Saran 711 (commercial name of a vinylidene copolymer fiber made by Asahi-Dow Ltd.).

The filtrate was treated in the same manner as in Example 23. The isopropyl alcohol was recovered by simple distillation under an atmospheric pressure to precipitate a carboxymethyl ethyl cellulose. The precipitate was filtered off, washed and dried until a constant weight was reached to give 92 g. of a purified low viscosity carboxymethyl ethyl cellulose.

The obtained low viscosity carboxymethyl ethyl cellulose had a viscosity of 8.2 cP., a whiteness of 91% and a trannsmittance of 95%. The product had a DS of carboxymethyl group of 0.50 and a DS of ethyl group of 2.10 and there was not observed any lowering in the DS of the substituents due to the depolymerization.

EXAMPLE 25

One hundred g. of the same carboxymethyl ethyl cellulose employed in Example 23 was treated in the same manner as in Example 23 except that 688 g. of methanol was employed instead of ethanol and the reaction time was changed to 9 hours to give 90 g. of a purified low viscosity carboxymethyl ethyl cellulose.

The obtained product had a viscosity of 12 cP., a whiteness of 93% and a transmittance of 97%. The product had a DS of carboxymethyl group of 0.42 and a DS of ethyl group of 2.10 and there was not observed any lowering in the DS of the substituents due to the depolymerization.

EXAMPLE 26

Into the same flask as employed in Example 23 were placed 200 g. of the same carboxymethyl ethyl cellulose as employed in Example 23, 576 g. of methanol and 144 g. of water, and the cellulose ether was completely dissolved into the mixed solvent at 70° C.. To the resulting solution was added 80 g. of a 35% aqueous solution of hydrogen peroxide, and the mixture was heated under reflux for 8 hours, whereby the viscosity of the reaction mixture was decreased from 8,200 cP. to 300 cP. The reaction mixture was filtered through the same filter cloth as employed in Example 23.

The filtrate was placed into the same flask as employed in Example 23 and the methanol was recovered by simple distillation. After the inner temperature was raised to a temperature of 85° to 90° C., the simple distillation was continued with adding 200 g. of water until the inner temperature of the flask was raised to 98° C. The obtained slurry was filtered and the resultant was treated in the same manner as in Example 23 to give 88 g. of a purified low viscosity carboxymethyl ethyl cellulose.

The obtained product had a viscosity of 13.6 cP., a whiteness of 93.5% and a transmittance of 97.0%. The product had a DS of carboxymethyl group of 0.42 and a DS of ethyl group of 2.10 and there was not observed any lowering in the DS of the substituents due to the depolymerization.

EXAMPLE 27

A CMC having a DS of carboxymethyl group of 0.39 and a viscosity of 90 cP. was mercerized in the same manner as in Example 24 except that the kneading temperature was changed to a temperature of 30° to 47° C. The mercerized CMC was etherified in the same manner as in Example 24 to give a carboxymethyl ethyl cellulose having a DS of carboxymethyl group of 0.39, a DS of ethyl group of 2.20, a viscosity of 1,800 cP., a whiteness of 75.0% and a transmittance of 62.0%.

Into the same flask as employed in Example 23 were placed 100 g. of the carboxymethyl ethyl cellulose, 616 g. of ethanol and 264 g. of water. The carboxymethyl ethyl cellulose was completely dissolved into the mixed solvent at 80° C. To the resulting solution was added 60 g. of a 35% aqueous solution of hydrogen peroxide, and the mixture was heated under reflux for 6 hours, whereby the viscosity of the reaction mixture was decreased from 4,700 cP. to 100 cP. The reaction mixture was filtered through the same filter cloth as employed in Example 23. The filtrate was treated in the same manner as in Example 23 to give a purified low viscosity carboxymethyl ethyl cellulose.

The obtained product had a viscosity of 9.5 cP., a whiteness of 97.0% and a transmittance of 99.0%. The product had a DS of carboxymethyl group of 0.39 and a DS of ethyl group of 2.20 and there is not observed any lowering in the DS of the substituents due to the depolymerization.

EXAMPLE 28

The mercerized CMC prepared in the same manner as in Example 11 was aged at a room temperature for a day and etherified in the same manner as in Example 24 to give a carboxymethyl ethyl cellulose having a DS of carboxymethyl group of 0.60, a DS of ethyl group of 1.92, a viscosity of 530 cP., a whiteness of 68.5% and a transmittance of 58.0%.

One hundred g. of the carboxymethyl ethyl cellulose was treated in the same manner as in Example 23 except that the reaction time was changed to 4 hours to give 92.5 g. of a purified low viscosity carboxymethyl ethyl cellulose.

The obtained product had a viscosity of 7.5 cP., a whiteness of 93.0% and a transmittance of 94.0%. The product had a DS of carboxymethyl group of 0.60 and a DS of ethyl group of 1.92 and there was not observed any lowering in the DS of the substituents due to the depolymerization.

COMPARATIVE EXAMPLE 5

Into the same flask as employed in Example 23 were placed 200 g. of the same carboxymethyl ethyl cellulose as employed in Example 23, 86 g. of methanol and 774 g. of water. Even though the mixture was agitated at 70° C., the carboxymethyl ethyl cellulose was not completely dissolved to give a slurry.

To the slurry was added 40 g. of a 35% aqueous solution of hydrogen peroxide, and the mixture was heated under reflux for 7 hours. The reaction mixture was filtered and the resultant was sufficiently washed with a hot water and dried at 70° C. until a constant weight was reached.

The obtained product had a whiteness of 91.0% and was somewhat bleached. However, the product was insoluble in a mixed solvent of ethanol and water (8:2 by weight).

COMPARATIVE EXAMPLE 6

The same procedures as in Example 23 except that 5 g. of p-toluenesulfonic acid was added with the aqueous solution of hydrogen peroxide were repeated to give a purified low viscosity carboxymethyl ethyl cellulose.

The obtained product had a viscosity of 7.1 cP., a whiteness of 97.0% and a transmittance of 67.0%. The product was somewhat improved in transmittance in comparison with the starting material but its transmittance was much lower than those of the low viscosity carboxymethyl ethyl celluloses obtained in Examples 23 to 28. The product had a DS of carboxymethyl group of 0.39 and a DS of ethyl group of 1.95 and there was observed some lowering in the DS of the substituents due to the depolymerization.

COMPARATIVE EXAMPLE 7

The same procedures as in Example 23 except that the reaction temperature and the reaction time were changed to 50° C. and 15 hours, respectively, were repeated to give a carboxymethyl ethyl cellulose having a whiteness of 87.0%, a transmittance of 71.0% and a viscosity of 1,080 cP. The bleaching effect was somewhat exhibited but the depolymerization did not almost take place.

What we claim is:

1. A process for preparing a cellulose ether which comprises reacting celluloses untreated or treated with an aqueous solution of alkali hydroxide with an etherifying agent in the presence of an aqueous solution of alkali hydroxide, an organic solvent being substantially immiscible with water and capable of dissolving the etherifying agent and a quaternary salt having the following general formula:

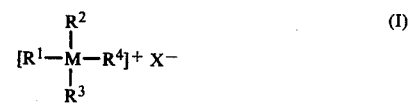

wherein M is nitrogen atom or phosphorus atom, $R^1$, $R^2$, $R^3$ and $R^4$ are independently an organic group selected from the group consisting of alkyl groups having 1 to 4 carbon atoms and aralkyl groups having 7 to 8 carbon atoms and $X^-$ is an anion.

2. The process of claim 1, in which the organic group of the quaternary salt is an alkyl group having 1 to 4 carbon atoms or benzyl.

3. The process of claim 1, in which the etherifing egent is an alkyl halide having 1 to 4 carbon atoms or benzyl halide.

4. The process of claim 1, in which the quaternary salt is prepared in situ by reacting a nitrogen compound or phosphine having the following general formula:

wherein M is the same as defined above, and $R^{10}$, $R^{11}$ and $R^{12}$ are independently hydrogen atom or an organic group selected from the group consisting of alkyl groups having 1 to 4 carbon atoms and aralkyl groups having 7 to 8 carbon atoms, with an excess of an etherifying agent selected from the group consisting of alkyl halides having 1 to 4 carbon atoms and aralkyl halides having from 7 to 8 carbon atoms.

5. The process of claim 4, in which the nitrogen compound or phosphine is compounds of the general formula (III) wherein $R^{10}$, $R^{11}$ and $R^{12}$ are independently hydrogen atom, an alkyl group having 1 to 4 carbon atoms or benzyl, provided that $R^{10}$, $R^{11}$ and $R^{12}$ are not hydrogen atom at the same time, and the etherifying agent is an alkyl halide having 1 to 4 carbon atoms or benzyl halide.

6. The process of claim 1, in which the celluloses employed as a starting material are an unsubstituted cellulose and the resulting cellulose ether is a cellulose ether substituted by an alkyl group having 1 to 4 carbon atoms or benzyl cellulose.

7. The process of claim 1, in which the celluloses employed as a starting material are a partially etherified cellulose and the resulting cellulose ether is a mixed cellulose ether.

8. The process of claim 7, in which the partially etherified cellulose is carboxymethyl cellulose, the etherifying agent is an ethyl halide and the mixed cellulose ether is carboxymethyl ethyl cellulose.

9. The process of claim 8, in which the aqueous solution of alkali hydroxide is an aqueous solution of sodium hydroxide in which the concentration of sodium hydroxide is not less than 40% by weight and less than 50% by weight.

10. The process of claim 8, in which the carboxymethyl cellulose is a mercerized carboxymethyl cellulose having a low molecular weight which is prepared by dissolving a carboxymethyl cellulose into a 30 to 70% by weight aqueous solution of alkali hydroxide and kneading the resulting solution in the presence of hydrogen peroxide at a temperature of 10° to 60° C. to give a mercerized carboxymethyl cellulose in the form of a soft powder or granules.

11. A process for preparing a carboxymethyl ethyl cellulose which comprises uniformly dissolving the carboxymethyl ethyl cellulose prepared by the process of claim 8 into an aqueous solution of a lower alcohol having 1 to 4 carbon atoms, and heating the resulting solution in the presence of hydrogen peroxide at a temperature of 60° C. to a reflux temperature.

12. The process of claim 11, in which the resulting carboxymethyl ethyl cellulose is recovered by removing the alcohol from the reaction mixture to precipitate it.

* * * * *